United States Patent [19]

Ng et al.

[11] 3,965,305

[45] June 22, 1976

[54] ARRANGEMENT FOR INCREASING THE CALL HANDLING CAPABILITIES OF A CROSSPOINT TANDEM SYSTEM

[75] Inventors: John Ng, Elmhurst; Melvin A. Jacobs, Hinsdale, both of Ill.

[73] Assignee: GTE Automatic Electric Laboratories Incorporated, Northlake, Ill.

[22] Filed: Dec. 30, 1974

[21] Appl. No.: 537,292

[52] U.S. Cl. .......................................... 179/18 EB
[51] Int. Cl.² ........................................ H04Q 3/42
[58] Field of Search ...................... 179/18 E, 18 EB

*Primary Examiner*—William C. Cooper
*Attorney, Agent, or Firm*—Robert J. Black

[57] ABSTRACT

In a communication switching system including a control unit for establishing connections through a switching matrix, the connections being established during a cycle of the control unit and the cycle being divided into a number of sequence states or sub-cycles which established logical functions are to be accomplished before advancing to the next sequence state, an arrangement for making the sequencing of the control unit permissive instead of absolutely controlled by a timer set for worst case operation. With the disclosed arrangement, advance to the next sequence state is permitted as soon as all of the logical functions are accomplished. The control unit also can advance to the next sequence state if the worst case operating time is exceeded, and with a peg count of the occurrence being made. On genuine trouble conditions, the control unit is not permitted to advance to the next sequence state, a trouble record is printed out, and the sequence state counter is reset to its idle state, with the connection being dropped.

10 Claims, 1 Drawing Figure

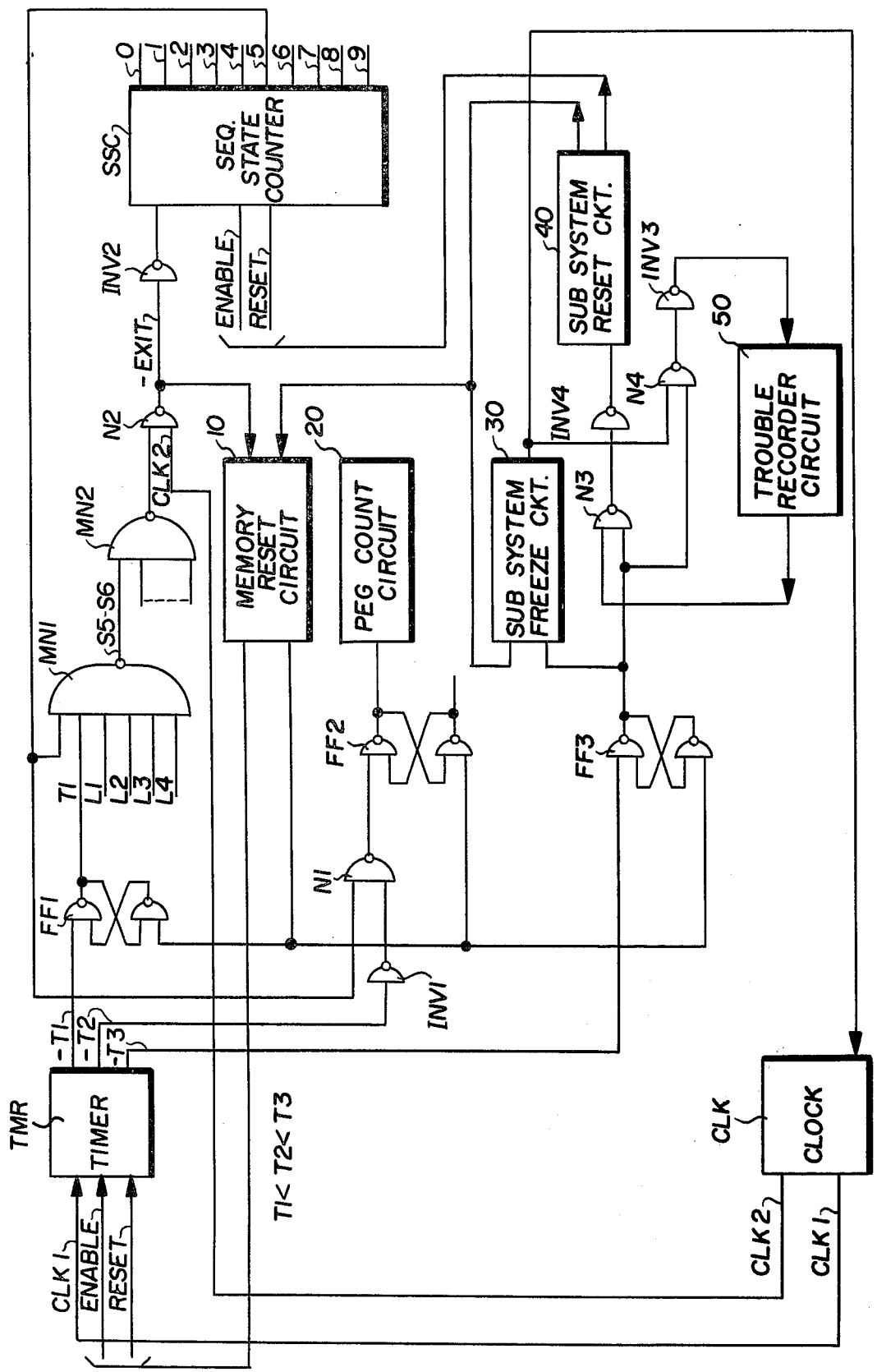

ARRANGEMENT FOR INCREASING THE CALL HANDLING CAPABILITIES OF A CROSSPOINT TANDEM SYSTEM

Cross-References to Related Applications

The present application relates to an improvement in the automatic common control switching system disclosed in U.S. Pat. Nos. 3,806,717 and 3,830,984.

Background of the Invention

This invention relates to an automatic common control switching system for local and/or toll tandem switching. More particularly, it relates to a method and means for connecting incoming trunks to an idle register-sender, within such a system. More particularly still, the invention relates to an improved method and apparatus for increasing the call handling capabilities of such a system.

In the above-identified related U.S. Pat. Nos. 3,806,717 and 3,830,984, there is disclosed an automatic common control switching system of the type commonly called a crosspoint tandem system. The function of the system is to switch calls received on incoming trunks to various kinds of outgoing trunks. As more specifically described therein, the operation of the crosspoint tandem system is generally as follows.

Each incoming trunk has two major appearances in the crosspoint tandem office, one on a trunk link frame (used for the talking connection) and one on a register-sender access subsystem (used for passing information to the common control equipment). The register-sender access subsystem is the first of the trunk appearances to be used. It consists of two sets of relay switches, with one set comprising trunk switches and the other set comprising register-sender switches. The incoming trunks appear on the trunk switches and the register-senders on the register-sender switches. As soon as the incoming trunk is seized, it signals a register-sender control unit (a RAC unit) of a register-sender access subsystem (a RAN unit) to connect an idle register-sender for registering the incoming pulses. The RAC unit sets up the connection, passes the trunk link inlet identity and trunk pre-translation class of service to the register-sender, and releases from the connection to be free to serve other calls. Each group of incoming trunks is served by a preestablished number of register-senders, with any one of the incoming trunks being connectable to any one of the register-senders via the RAN unit, under the control of the RAC unit.

As indicated above, when the RAC unit detects a trunk call for service, the RAC unit will connect the trunk through the RAN unit to an idle register-sender. The duration of the cycle of the RAC unit for trunk to register-sender connection is divided into a number of sequence states. A sequence state is defined as a fixed time period during which a particular series of functions or tasks in a predetermined sequence are to be accomplished. Each sequence state is allocated with worst case timing to accomplish the allocated functions (select idle network path, select idle register-sender, pull and mark the network path, etc.). If the fixed time period of a sequence state is exceeded, it is assumed that the device being controlled has failed and a trouble record is made. Thus, with each sequence state set for worst case timing, the RAC unit will cycle at fixed worst case timing for each and every call.

Since the RAC unit cycles at a fixed time interval for each and every call based on worst case timing, the cycle time of the RAC unit is maximized. Therefore, the call handling capability of the RAC unit is reduced.

The RAN unit of the crosspoint tandem system is a relay crosspoint network. Since electro-mechanical devices can randomly and occasionally exceed their worst case operation and release time, trouble tickets without actual failure are occasionally and randomly generated from the RAC unit. These trouble tickets are misleading and result in the maintenance and installation personnel attempting to correct the "problem", by readjusting the relay crosspoint switches. This attempt to readjust the switches and thus eliminate the trouble tickets can actually result in maladjusted switches and more trouble tickets. If an attempt is made to eliminate this type of trouble ticket by extending the time period between the worst case time of each of the sequence states, the cycle time of the RAC unit would be further extended. As a result, the call handling capability of the RAC unit would be further reduced.

Accordingly, it is an object of the present invention to provide an improved method and apparatus for connecting incoming trunks to an idle register-sender, within such a crosspoint tandem system.

More particularly, it is an object to provide an improved method and apparatus for increasing the call handling capability of such a crosspoint tandem system.

More particularly still, it is an object to improve the call processing capability of the RAC unit of the crosspoint tandem system and to eliminate such misleading trouble tickets.

Generally, the above objects are accomplished in accordance with the present invention by making the sequencing of the RAC unit permissive instead of being absolutely controlled by the timer set for the worst case operation of the RAC unit. Advance to the next sequence state is permitted to take place as the result of the accomplishment of all functions defined for the previous state. The RAC unit will not wait for the expiration of the timer to advance to the next state. This improved operation permits the RAC unit to operate as fast as possible and reduces the average RAC unit cycle time on all calls.

The permissive sequencing of the RAC unit also permits the RAC unit to advance to the next sequence state without trouble tickets if the worst case operating time of the devices are occasionally exceeded. To provide some statistical data from which to evaluate the performance of the relay crosspoint switches, the timer output is used to generate peg counts whenever the worst case time is exceeded for the sequence states. On genuine trouble conditions or in case of switch failures, the functions allocated for the sequence state will not be accomplished and the RAC unit will not complete the sequence state. A trouble ticket will be printed.

Other objects of the invention will in part be obvious and will in part appear hereinafter.

Brief Description of the Drawing

For a fuller understanding of the nature and objects of the invention, reference should be had to the following detailed description taken in connection with the accompanying drawing, in which:

FIG. 1 is a block diagram schematic of the apparatus of the present invention.

Description of the Preferred Embodiment

Referring now to the drawing, the timer TMR, which normally controls the sequencing of the sequence-state counter SSC, is illustrated and, in the instant case, it is shown as having three outputs —T1, —T2, and —T3. The timer TMR output —T1 is set for the minimum or fastest time interval in which all of the logical functions to be performed in a sequence state can be accomplished. The output —T2 is set for the worst case time interval that the subsystem will accomplish all of these logical functions. The output —T3 is set beyond the worst case time interval of output —T2.

In the illustrated embodiment, only the circuitry controlling the advancing from sequence state 5 to sequence state 6 is illustrated, however, in an actual application of the invention, the circuitry would be duplicated, depending upon the number of different sequence states, i.e., the advances that are to be controlled. Again, in the illustrated embodiment, the logical functions to be accomplished are indicated to be logical functions L1, L2, L3 and L4, the same being illustrated as such at the input to the NAND gate MN1. In any particular sequence state, a greater or lesser number of such logical functions may need to be performed, in which case the input to the associated NAND gate, such as the NAND gate MN1, would correspond to them. Also, the number of inputs to the NAND gate MN2 will correspond to the number of different sequence states controlled by the arrangement, as indicated by the additional unlabeled inputs to the NAND gate MN2. All of the above will be more apparent from the description below.

The timer TMR counts clock pulses from the clock CLK, and outputs a logic 0 signal on the respective outputs —T1, —T2, and —T3, when the count corresponds to the established time interval. Again, in an actual application, the timer TMR could be a variable timing timer operable to provide any number of different sets of outputs —T1, —T2 and —T3, with each set having different time intervals established as described above, for each controlled sequence state. Alternatively, individual timers can be provided for each controlled sequence state.

The clock CLK outputs two different series of clock pulses, CLK1 and CLK2. The clock pulse series CLK1 drive the timer TMR, and the clock pulse series CLK2 are used to gate the NAND gate N2. The clock pulses CLK2 are of a much higher frequency, e.g., 20,000 Hz, in comparison to the clock pulse series CLK1, e.g., 735 Hz, so that the NAND gate N2 is gated almost simultaneously when the logical functions are all accomplished and the system is ready to advance to the next sequence state.

Before describing the operation of the arrangement, the various circuits indicated in the block diagram schematic are described to provide a clear understanding of the overall operation of the arrangement.

Memory Reset Circuit 10

The memory reset circuit 10 is a circuit which functions to output a logic 0 to each of the latches FF1, FF2 and FF3, to reset them, and a signal to reset the timer TMR, when a logic 0 signal is coupled to the memory reset circuit 10 from the system reset circuit 40 or the NAND gate N2. The memory reset circuit 10 also, after a time delay, again enables the timer TMR.

Peg Count Circuit 20

The peg count circuit 20 is basically a counter circuit. Each time a logic 1 (changed from logic 0) is inputed to the peg count circuit 20, it increments its data count by 1.

Subsystem Freeze Circuit 30

The subsystem freeze circuit 30 is a circuit which operates such that a logic 1 input to it from the latch FF3 will disable the clock CLK to prevent the latter from outputing the clock pulse series CLK2. With the clock CLK disabled, the subsystem is froze or stopped from attempting to complete the logical functions for the sequence state. The subsystem freeze circuit 30 also provides a logic 1 input to the NAND gate N4, for initiating the operation of the trouble recorder circuit 50, as described more particularly below.

A logic 0 input to the subsystem freeze circuit 30 from the subsystem reset circuit 40 will operate the subsystem freeze circuit 30 to unfreeze or enable the clock CLK, and to remove the logic 1 signal to the NAND gate N4.

Subsystem Reset Circuit 40

The subsystem reset circuit 40 is a circuit which operates such as to provide the logic signals to reset and to enable sequence state counter SSC and to generate a logic 0 signal to the subsystem freeze circuit 30 and the memory reset circuit 10, when a logic 1 signal is coupled to its input.

Trouble Recorder Circuit 50

The trouble recorder circuit 50 is a circuit which operates such as to initiate the operation of the trouble recorder (not shown) to transfer or dump all of the call processing data and trouble data from the subsystem memory to the teletype for a printout recording, when a logic 1 is coupled to its input. When the trouble recorder has completed the data transfer for a printout, a logic 1 signal is provided to NAND gate N3.

After having now described the various different circuits of the arrangement, the operation thereof can be described as follows. The timer TMR and the latches FF1-FF3 are reset in the beginning of the sequence state, by the memory reset circuit 10. As indicated above, after a time delay, the memory reset circuit 10 again enables the timer TMR to count the clock pulses CLK1 from the clock CLK. Assume for the purpose of describing the operation of the arrangement, that the sequence state counter now is in sequence state 5, and a logic 1 output is coupled to the NAND gate MN1 and to the NAND gate N1. When the count of the timer TMR reaches a count corresponding to the minimum or fastest time interval that all of the logical functions can be accomplished in the sequence state 5, its output —T1 goes to a logic 0 which is coupled to the latch FF1. The latter is operated by this logic 0 signal to output a logic 1 on the T1 input of the NAND gate MN1. If or when all the logical functions L1, L2, etc. are accomplished for the sequence state at time —T1, all of the inputs to the NAND gate MN1 will be at a logic 1. The NAND gate MN1 is gated to provide a logic 0 input to the NAND gate MN2. The logic 0 input to the NAND gate MN2 (the previous inputs to the NAND gate MN2 were all logic 1's) will gate the NAND gate MN2 to provide a logic 1 output to the NAND gate N2. During the occurrence of the next clock pulse CLK2, both inputs to the NAND gate N2 will be a logic 1, and the NAND gate N2 will be enabled to output a logic 0 which is coupled through the inverter INV2 to the sequence state counter SSC to advance the sequence state counter to sequence state 6. The logic 0 at the output of the NAND gate N2 also is coupled to the memory reset circuit 10 to operate it to output a logic 0 to the latches FF2-FF3 to reset them, and a logic 0 signal to the timer TMR to reset it. After a time delay, the memory reset circuit 10 again enables the timer TMR to count the clock pulses CLK1.

The operation would proceed as described above, for the next controlled sequence state.

The subsystem can complete the sequence state any time after time interval —T1, whenever all of the logical functions L1, L2, etc. are accomplished.

If all of the logical functions are not accomplished at time interval —T2, the timer output —T2 goes to a logic 0 which is coupled through the inverter INV1, to the NAND gate N1. Both inputs to the NAND gate N1, at this time, will be at a logic 1, and it outputs a logic 0 to set the latch FF2. The latch FF2 provides a logic 1 input to the peg count circuit 20 to increment its data count by 1. The peg count data will be used for statistical trouble analysis, as described above. When all of the logical functions for the sequence state are accomplished, the sequence state counter will advance, the timer and the latches will reset, as previously described.

The subsystem also still can complete the sequence state any time after the time interval —T2, whenever all of the logical functions L1, L2, etc. are accomplished.

If a failure occurs, the logical functions for the sequence state will not be completed. At time interval —T3, the —T3 output of the timer TMR will go to a logic 0, and this logic 0 is coupled to the latch FF3 to set it. The latch FF3, on being set, provides a logic 1 signal to the subsystem freeze circuit 30, and to the NAND gate N3 and N4. The logic 1 at the input of the subsystem freeze circuit 30 operates it to provide a logic 1 output to the clock CLK to terminate the clock pulse CLK2 output pulses, thereby stopping the subsystem from attempting to complete the logical functions for the sequence state. The logic 1 output of the subsystem freeze circuit 30 also is coupled to the NAND gate N4. With both inputs of the NAND gate N4 now being at a logic 1, the NAND gate N4 is gated to provide a logic 0 output which is coupled through the inverter INV3 which then provides a logic 1 input to the trouble recorder circuit 50. The logic 1 input to the trouble recorder circuit 50 will initiate the trouble recorder to transfer or dump all the call processing data and trouble data from the subsystem memory to the teletype for a printout recording. When the trouble recorder has completed the data transfer for a printout, a logic 1 signal is coupled from the trouble recorder circuit 50 to the NAND gate N3.

At this time, with both inputs to the NAND gate N3 being at a logic 1, the NAND gate N3 is gated to provide a logic 0 output which is coupled through the inverter INV4 to provide a logic 1 input to the subsystem reset circuit 40.

The logic 1 input to the subsystem reset circuit 40 operates the latter to provide the logical signals to reset the sequence state counter SSC to its idle state 0. The subsystem reset circuit also generates a logic 0 signal to the subsystem freeze circuit 30 and to the memory reset circuit 10. With the logic 0 input signal to the subsystem freeze circuit 30, its output goes to a logic 0, thus reinitiating the clock pulse series CLK2 and the logic 0 to the NAND gate N4. The NAND gate N4 removes the logic 1 input to the trouble recorder circuit 50. The logic 0 input to the memory reset circuit 10 again operates it to output a logic 0 to the latches FF1-FF3 to reset them and to provide a signal to the timer TMR to reset it. After the time delay, the subsystem reset circuit 40 again enables the sequence state counter SSC and the memory reset circuit 10 again enables the timer TMR.

Accordingly, from the above description, it can be seen that the sequence state counter SSC can be caused to advance from one sequence state to another, as soon as the logic functions associated with that sequence state all have been accomplished. Also, if the logical functions are not accomplished in the worst case time interval (—T2) the peg count circuit 20 is operated to indicate this fact, however, the sequence state counter SSC still can advance to the next sequence state, provided the logical functions all are accomplished prior to the time interval —T3. If the logical functions all are not accomplished by the time interval —T3, the trouble condition is recorded and the two logic 1 inputs to the NAND gate N3 after the trouble has been recorded, will release the subsystem from freeze and reset the sequence state counter SSC to its idle state 0. The circuit arrangement, therefore, permits the RAC unit to operate as fast as possible and will actually reduce the average RAC cycle time on all normal calls.

The memory reset circuit 10, the peg count circuit 20, the subsystem freeze circuit 30, and the subsystem reset circuit 40 all are merely shown in block diagram, since it will be appreciated that, from the above description, these circuits are formed of various logic circuits. Also, from the description of the operation of these circuits, i.e., the inputs to and the outputs thereof, it will be apparent that the necessary logic employed may take various different forms, depending upon the particular circuit designer who develops the logic. Accordingly, the particular logic employed forms no part of the present invention. The trouble recorder circuit 50 also is comprised of various circuits which form no part of the present invention, and its operation is significant only in the fact that it initiates the trouble record printout and provides an output to the NAND gate N3 upon completion of the printout.

It will thus be seen that the object set forth above, among those made apparent from the preceding description, are efficiently attained and certain changes may be made in the above construction. Accordingly, it is intended that all matter contained in the above description or shown in the accompanying drawing shall be interpreted as illustrative and not in a limiting sense.

Now that the invention has been described, what is claimed as new and desired to be secured by Letters Patent is:

1. A communication switching system including a plurality of incoming trunks, a plurality of register-senders, a switching network for connecting any one of said incoming trunks with any one of said register-senders, a register-sender access control circuit for establishing said connections, each of said connections being established during a cycle of said register-sender access control circuit and each cycle thereof being divided into a number of sequence states in each of which pre-established logical functions must be accomplished before said register-sender access control circuit can advance from one sequence state to another, and a sequence state counter for establishing said sequence states, the improvement comprising an arrangement for improving the call handling capability of said register-sender access control circuit, said arrangement comprising timer means for providing a plurality of time interval output signals including a first time interval output signal which is set for the minimum time interval in which all of the logical functions to be performed in a sequence state can be accomplished, reset means for resetting and enabling said timer means to provide said time interval output signals associated with a sequence state, and first gating means, said first time interval output signal and signals indicating the completion of each of the logical functions to be completed in a sequence state being coupled to said first gating means, the receipt in coincidence of all of said signals enabling said first gating means, said first gating means upon being enabled providing an output signal which is coupled to and operates said sequence state counter to advance the sequence state to the next sequence state, whereby said register-sender access control circuit is permitted to complete a sequence state as the result of the accomplishment of all logical functions defined for that sequence state, and which is coupled to and operates said reset means to reset and enable said timer means.

2. The improvement of claim 1, further including clock means for providing a first series of clock pulses for driving said timer means and a second series of clock pulses, and a second gating means, said second series of clock pulses and said output signals from said first gating means being coupled to said second gating means, said second gating means being enabled upon receipt of one of said second series of clock pulses and an output signal from said first gating means, said second gating means upon being enabled providing an output signal which is coupled to and operates said sequence state counter to advance the sequence state to the next sequence state and which is coupled to and operates said reset means to reset and enable said timer means, whereby said register-sender access control circuit is permitted to advance to the next sequence state as the result of the accomplishment of all logical functions defined for each sequence state immediately upon the occurrence of one of said second series of clock pulses.

3. The improvement of claim 2, wherein said timer means provides a first time interval output signal which is set for the minimum time interval in which all of the logical functions to be performed in a sequence state can be accomplished, a second time interval output signal which is set for the worst case time interval in which all of the logical functions will be accomplished and a third time interval output signal which is set beyond the worst case time interval, first latch means operated by said second time interval output signal to provide a peg count pulse, whereby said peg count pulse can be coupled to a peg count means to operate the latter to update its count by one each time said second time interval output signal occurs prior to said sequence state being advanced to thereby provide an indication that all of the logical functions to be accomplished during a sequence state during the established worst case time interval were not accomplished.

4. The improvement of claim 3, further including second latch means, and control means for terminating said second series of clock pulses and for resetting said sequence state counter to its idle state, said third time interval output signal being coupled to and operating said second latch means to provide an output signal to said control means to operate the latter, whereby said sequence state counter is reset to its idle state each time said third output time interval output signal occurs prior to said sequence state being advanced to thereby cause said register-sender access control circuit to drop said connection.

5. The improvement of claim 4, wherein said control means comprises a subsystem freeze circuit for terminating said second series of clock pulses until said sequence state counter is reset to its idle state, a subsystem reset circuit for resetting said sequence state counter to its idle state and for operating said reset means to reset and enable said timer means, and gating means for initiating the operation of a trouble record circuit to provide a trouble record.

6. The improvement of claim 5, wherein the output signal of said second latch means is coupled to said subsystem freeze circuit to operate the latter to provide an output signal to initiate the operation in terminating said second series of clock pulses and to a first control gate, the output signal from said subsystem freeze circuit also being coupled to said first control gate, said first control gate being enabled upon receipt in coincidence of said two signals to provide an output signal to initiate the operation of the trouble record circuit.

7. The improvement of claim 6, further including a second control gate, the output signal of said second latch means and a signal indicating the completion of the trouble record print-out being completed being coupled to said second control gate upon receipt of said two signals in coincidence said control gate being enabled to provide a signal to operate said subsystem reset circuit to reset said sequence state counter to its idle state and to operate said reset means to reset said timer means.

8. The improvement of claim 7, wherein said subsystem reset circuit upon being operated further operating said subsystem freeze circuit reinitiate said second series of clock pulses.

9. The improvement of claim 3, comprising timer means associated with each sequence state to be controlled.

10. The improvement of claim 3, comprising a variable timing timer means operable to provide time interval output signals associated with each sequence state to be controlled.

* * * * *

UNITED STATES PATENT AND TRADEMARK OFFICE
CERTIFICATE OF CORRECTION

PATENT NO. : 3,965,305
DATED : June 22, 1976
INVENTOR(S) : JOHN NG and MELVIN A. JACOBS It is certified that error appears in the above-identified patent and that said Letters Patent are hereby corrected as shown below:

Column 8, line 41, after "gate" add - and --

Signed and Sealed this

Thirty-first Day of August 1976

[SEAL]

Attest:

RUTH C. MASON
Attesting Officer

C. MARSHALL DANN
Commissioner of Patents and Trademarks